(12) United States Patent
Chinnathambi et al.

(10) Patent No.: US 10,931,675 B2
(45) Date of Patent: Feb. 23, 2021

(54) LOCAL API ACCESS AUTHORIZATION (71) Applicant: Microsoft Technology Licensing, LLC, Redmond, WA (US)

(72) Inventors: Kirupa Chinnathambi, Redmond, WA (US); Kiril Nikolov Seksenov, Seattle, WA (US); John-David Lewis Dalton, Woodinville, WA (US); David L. Risney, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 262 days.

(21) Appl. No.: 15/950,096

(22) Filed: Apr. 10, 2018

(65) Prior Publication Data
US 2019/0312874 A1 Oct. 10, 2019

(51) Int. Cl.
H04L 29/06 (2006.01)
G06F 21/51 (2013.01)
G06F 21/53 (2013.01)
H04L 29/08 (2006.01)
G06F 8/60 (2018.01)

(52) U.S. Cl.
CPC .......... H04L 63/101 (2013.01); G06F 21/51 (2013.01); G06F 21/53 (2013.01); *G06F 8/60* (2013.01); *H04L 67/02* (2013.01)

(58) Field of Classification Search
CPC ....... H04L 63/101; H04L 67/02; G06F 21/51; G06F 21/53; G06F 8/60
See application file for complete search history.

(56) References Cited

U.S. PATENT DOCUMENTS

| 8,150,939 | B1 | 4/2012 | Murray |
| 8,407,599 | B1* | 3/2013 | Klein ................ H04L 67/02 715/739 |
| 8,458,656 | B1* | 6/2013 | Liang ............... H04L 67/1085 717/118 |
| 8,595,186 | B1 | 11/2013 | Mandyam et al. |
| 8,635,701 | B2* | 1/2014 | Hilaiel ................ G06F 21/53 726/25 |

(Continued)

OTHER PUBLICATIONS

Martin Hristov Georgiev, "On the (In)security of Service APIs", Dissertation, Aug. 2015, 239 pages. (Year: 2015).*

(Continued)

Primary Examiner — Michael Pyzocha
(74) Attorney, Agent, or Firm — Alleman Hall Creasman & Tuttle LLP (57) ABSTRACT A computing device, including one or more output devices and a processor. The processor may be configured to download a web application. The web application may include an authorization certificate and a metadata file that includes an identifier of at least one local application program interface (API) of the computing device that is not included in an API whitelist of a web host application program. The processor may determine, based on the authorization certificate and the metadata file, that the web application is authorized to access the at least one local API. The processor may execute the web application at the web host application program. Executing the web application may include utilizing the at least one local API. The processor may convey at least one output of the web application for output at the one or more output devices.

20 Claims, 5 Drawing Sheets

(56) References Cited

U.S. PATENT DOCUMENTS

| | | | |
|---|---|---|---|
| 8,843,820 B1* | 9/2014 | Kay | G06F 21/51 |
| | | | 715/234 |
| 9,208,235 B1* | 12/2015 | Liu | G06F 16/951 |
| 9,262,593 B2* | 2/2016 | Kay | G06F 21/00 |
| 9,471,553 B2 | 10/2016 | Ligman et al. | |
| 9,582,300 B2* | 2/2017 | Martori | H04L 67/42 |
| 9,619,307 B2 | 4/2017 | Maltese et al. | |
| 9,852,294 B1* | 12/2017 | Zhu | G06F 21/562 |
| 10,033,747 B1* | 7/2018 | Paithane | G06F 21/54 |
| 10,079,854 B1* | 9/2018 | Scott | G06F 16/958 |
| 10,425,465 B1* | 9/2019 | Jha | H04L 67/42 |
| 2006/0101336 A1 | 5/2006 | Edwards et al. | |
| 2006/0161878 A1* | 7/2006 | Koh | G06F 8/10 |
| | | | 717/100 |
| 2008/0009337 A1* | 1/2008 | Jackson | A63F 13/12 |
| | | | 463/16 |
| 2008/0147671 A1* | 6/2008 | Simon | G06F 16/957 |
| 2009/0222925 A1 | 9/2009 | Hilaiel et al. | |
| 2010/0064299 A1* | 3/2010 | Kacin | G06F 21/53 |
| | | | 719/317 |
| 2010/0235885 A1* | 9/2010 | Persson | G06F 21/629 |
| | | | 726/4 |
| 2010/0275014 A1* | 10/2010 | Kelley | G06F 21/51 |
| | | | 713/157 |
| 2011/0085667 A1* | 4/2011 | Berrios | H04L 9/321 |
| | | | 380/282 |
| 2011/0125759 A1* | 5/2011 | Querel | G06F 16/957 |
| | | | 707/748 |
| 2011/0154305 A1 | 6/2011 | LeRoux et al. | |
| 2011/0239270 A1* | 9/2011 | Sovio | G06F 21/6236 |
| | | | 726/1 |
| 2012/0042016 A1* | 2/2012 | Kroeger | G06F 16/954 |
| | | | 709/206 |
| 2012/0159310 A1 | 6/2012 | Chang et al. | |
| 2012/0174224 A1* | 7/2012 | Thomas | G06F 21/566 |
| | | | 726/24 |
| 2013/0055289 A1* | 2/2013 | Maltese | G06F 9/545 |
| | | | 719/320 |
| 2013/0227424 A1* | 8/2013 | Hall | G06F 40/14 |
| | | | 715/740 |
| 2014/0075021 A1* | 3/2014 | Revanuru | H04L 41/5041 |
| | | | 709/224 |
| 2014/0109115 A1* | 4/2014 | Low | G06F 9/44526 |
| | | | 719/328 |
| 2014/0129920 A1* | 5/2014 | Sheretov | G06F 40/14 |
| | | | 715/234 |
| 2014/0201619 A1* | 7/2014 | Mo | G06F 40/14 |
| | | | 715/234 |
| 2014/0337424 A1* | 11/2014 | Lee | H04L 63/0823 |
| | | | 709/204 |
| 2015/0134962 A1* | 5/2015 | Mahajan | H04L 63/061 |
| | | | 713/171 |
| 2015/0135198 A1* | 5/2015 | Pack, III | G06F 9/542 |
| | | | 719/318 |
| 2015/0180875 A1* | 6/2015 | Kay | H04W 12/08 |
| | | | 726/4 |
| 2015/0200955 A1* | 7/2015 | Martin | H04L 63/168 |
| | | | 726/23 |
| 2016/0044137 A1* | 2/2016 | Nakazawa | H04L 67/34 |
| | | | 709/203 |
| 2016/0182485 A1* | 6/2016 | Zhao | G06F 21/6209 |
| | | | 726/4 |
| 2016/0241560 A1* | 8/2016 | Reshadi | H04L 63/101 |
| 2018/0007167 A1* | 1/2018 | Biron, III | H04L 41/22 |
| 2019/0037005 A1* | 1/2019 | Palladino | G06F 8/73 |
| 2019/0227794 A1* | 7/2019 | Mercille | G06F 9/45504 |
| 2019/0228150 A1* | 7/2019 | Johns | G06F 21/51 |
| 2019/0238544 A1* | 8/2019 | Rajahram | G06F 9/547 |
| 2019/0251198 A1* | 8/2019 | Shamsutdinov | G06F 16/27 |

OTHER PUBLICATIONS

Puder, et al., "Exposing Native Device APIs to Web Apps", In Proceedings of the 1st International Conference on Mobile Software Engineering and Systems, Jun. 2, 2014, 9 Pages.

"International Search Report and Written Opinion Issued in PCT Application No. PCT/US19/023953", dated Jun. 17, 2019, 12 Pages.

* cited by examiner

LOCAL API ACCESS AUTHORIZATION

BACKGROUND

Existing web applications (application programs that run inside web browsers or other web hosts) are typically limited in terms of what application program interfaces (APIs) they can access. Typically, the APIs that are accessible by a web application are small subset of the public APIs available in an operating system and are defined in a whitelist. The operating system does not permit calls to non-whitelisted APIs by web applications executed in-browser or other in other web hosts. In contrast, native applications may utilize a wide range of local APIs, up to and including the entire public API catalog for a given operating system. With access to only a small submit of the publicly available APIs, existing web applications are unable to perform some functions that can be performed by native applications. In addition, existing web applications may be unable to run on some computing devices due to differences in the APIs that are made available to web applications by different devices.

SUMMARY

According one aspect of the present disclosure, a computing device is provided, including one or more output devices and a processor. The processor may be configured to download a web application. The web application may include an authorization certificate and a metadata file that includes an identifier of at least one local application program interface (API) of the computing device that is not included in an API whitelist of a web host application program executed by the processor. The processor may be further configured to determine, based on the authorization certificate and the metadata file, that the web application is authorized to access the at least one local API that is not included in the API whitelist. The processor may be further configured to execute the web application at the web host application program. Executing the web application may include utilizing the at least one local API that is not included in the API whitelist. The processor may be further configured to convey at least one output of the web application for output at the one or more output devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
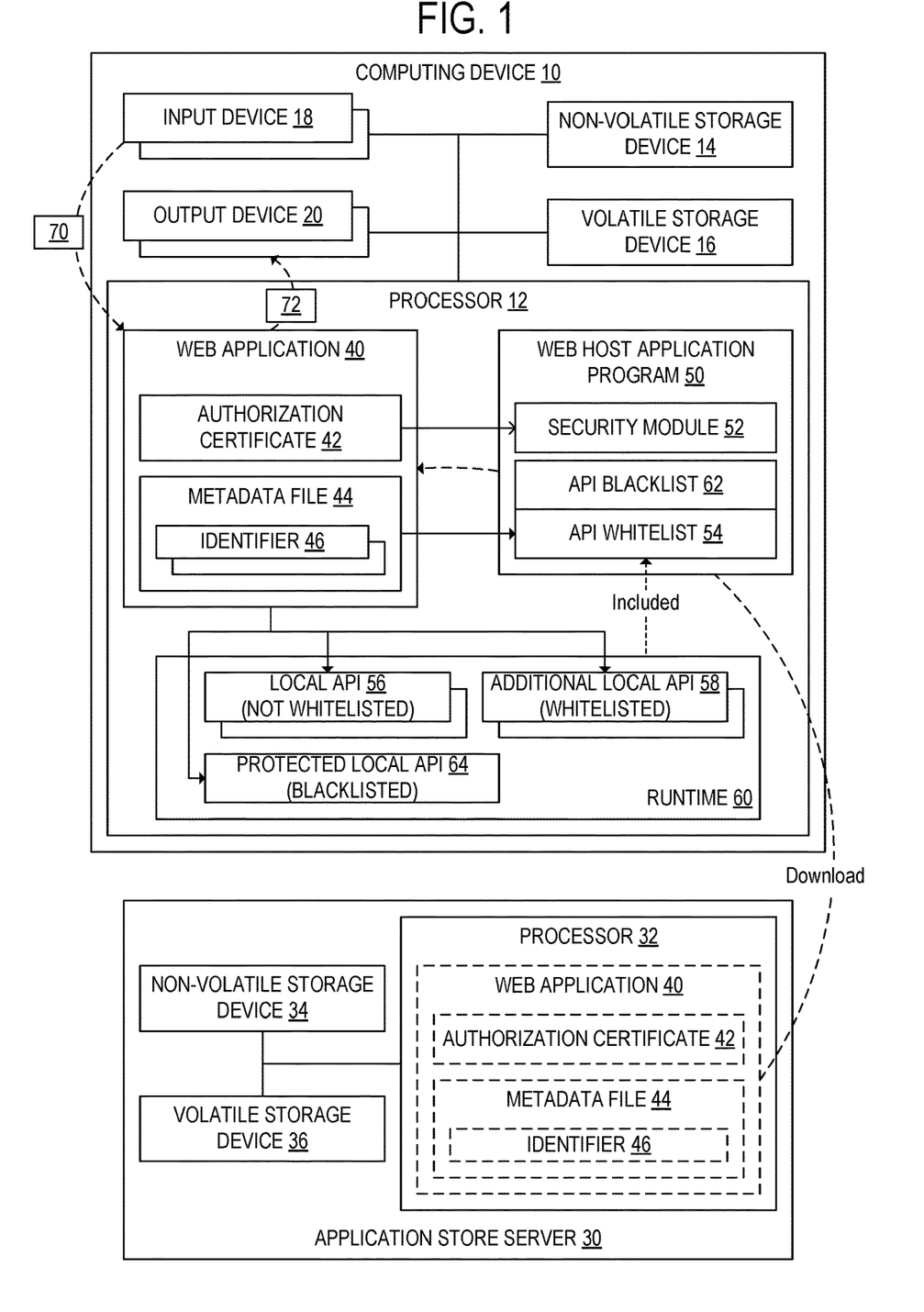
FIG. 1 shows an example computing device including a processor configured to execute a web application at a web host application program, according to one embodiment of the present disclosure.

In order to address the challenges discussed above, a computing device 10, shown in the example embodiment of FIG. 1, is provided. The computing device 10 may comprise one or more input devices 18 and/or one or more output devices 20. The one or more input devices 18 may include, for example, one or more of a mouse, a touchscreen, a trackpad, a keyboard, a camera, a microphone, and/or other input devices. The one or more output devices 20 may include, for example, one or more of a display screen, a speaker, a haptic feedback device, and/or other output devices. The computing device 10 may further comprise one or more of a processor 12, a non-volatile storage device 14, and/or a volatile storage device 16.

The processor 12 may be configured to download a web application 40. In some embodiments, the processor 12 of the computing device 10 may download the web application 40 from an application store server 30. In such embodiments, the application store server 30 may include a processor 32, a non-volatile storage device 34, and/or a volatile storage device 36.

The web application 40 may include an authorization certificate 42. In some embodiments, the authorization certificate 42 may include a user license that indicates that the processor 12 of the computing device 10 may execute the application. The authorization certificate 42 may include a source identifier that indicates that the web application 40 was downloaded from a trusted source. In embodiments in which the web application 40 is downloaded from an application store server 30, the source identifier may indicate the application store server 30 as the source of the web application 40. The authorization certificate 42 may be encrypted.

The web application 40 may further include a metadata file 44 that includes an identifier 46 of at least one local application program interface (API) 56 of the computing device 10. For example, the at least one local API 56 may be a notification API, a contacts API, a calendar API, a messaging API, a virtual assistant API, a graphics API, a camera API, a microphone API, a speaker API, a motion sensor API, or some other API. It will be appreciated that this list of example APIs is merely exemplary, and many other APIs available in the publicly available API suite of the operating system of the computing device could be identified by the identifier 46. The at least one local API 56 may be configured to be executed via a runtime 60. For example, the runtime 60 may be WINDOWS Runtime (WinRT). In some embodiments, the metadata file 44 may include a plurality of identifiers 46 that indicate a plurality of local APIs. The metadata file 44 may additionally or alternatively indicate other metadata associated with the web application, such as a file type of the web application 40, a file size of the web application 40, and/or a time at which the web application 40 was downloaded and/or most recently modified.

The processor 12 may be further configured to execute a web host application program 50, which may be a second runtime. The web host application program 50 may, for example, be MICROSOFT WWAhost, APPLE WebView, or GOOGLE ANDROID WebView, as some examples. In some embodiments, the web host application program 50 may be a web browser that includes one or more web browser graphical user interface (GUI) elements that enable web navigation. For example, the one or more web browser GUI elements may include an address bar, a search bar, a bookmarks menu, a back button, a forward button, a refresh button, and/or other web browser GUI elements. In other embodiments, instead of being a web browser, the web host application program may have an associated window that does not include any web browser GUI elements. The web host application program may have an associated whitelist that defines a set of APIs that the operating system executed by processor 12 allows the web host application program to call. The set of APIs in the white list is typically substantially smaller than the set of APIs in the full list of publicly available APIs of the operating system, which the operating system permits native applications executed by the processor 12 to call.

A security module 52 of the web host application program 50 may be configured to receive the authorization certificate 42 of the web application 40. Based on the authorization certificate 42 of the web application 40, the web host application program 50 may determine a set of security privileges to grant to the web application 40. For example, in some embodiments, the web application 40 may be downloaded via the web host application program 50. In such embodiments, the web host application program 50 may download the web application 40 based at least in part on the authorization certificate 42 and/or the metadata file 44 of the web application 40. For example, the web host application program 50 may determine, based on the authorization certificate 42 of the web application 40, that the web application 40 is from a trusted source, and may download the web application 40 based on that determination. In another example, the web host application program 50 may determine, based on the at least one local API 56 indicated in the metadata file 44, that the web application 40 is compatible with the computing device 10, and may download the web application 40 based on that determination.

The web host application program 50 may be configured to receive the metadata file 44 from the web application 40. Based on the identifier 46 included in the metadata file 44, the processor 12 may determine that the at least one local API 56 is not included in an API whitelist 54 of the web host application program 50. The API whitelist 54 may indicate at least one additional local API 58 that may be accessed by any web application 40. In addition to the at least one local API 56 that is not included in the API whitelist 54, the metadata file 44 may indicate at least one additional local API 58 that is included in the API whitelist 54.

In addition to the API whitelist 54, the web host application program 50 may include an API blacklist 62 that indicates one or more local APIs that may not be accessed by any web applications 40. The one or more local APIs indicated in the API blacklist 62 may be accessed by native applications only.

The processor 12 may be configured to determine, based on the authorization certificate 42 and the metadata file 44, that the web application 40 is authorized to access the at least one local API 56 that is not included in the API whitelist 54 of the web host application program 50. For example, the processor 12 may determine that the at least one local API 56 is indicated in both the authorization certificate 42 and the metadata file 44. In some embodiments, in response to determining that the web application 40 is authorized to access the at least one local API 56, the processor 12 may be further configured to add the at least one local API 56 to the API whitelist 54. The processor 12 may determine whether the web application 40 is authorized to access each local API 56 for which the metadata file 44 includes an identifier 46.

The processor 12 may be further configured to execute the web application 40 at the web host application program 50. Executing the web application 40 may include utilizing the at least one local API 56 that is not included in the API whitelist 54. In some embodiments, executing the web application 40 may further include utilizing the at least one additional local API 58 that is included in the API whitelist 54. If the metadata file 44 of the web application 40 indicates protected local API 64 that the web application 40 is not authorized to access, for example, a local API included in the API blacklist 62, the web host application program 50 may execute the web application 40 without calling the protected local API 64. Alternatively, the web host application program 50 may inhibit execution of the web application 40.

The processor 12 may be further configured to convey at least one output 72 of the web application 40 for output at the one or more output devices 20. In some embodiments, the at least one local API 56 that is not included in the API whitelist 54 may be associated with the one or more output devices 20, and the at least one output 72 may be conveyed for output at the one or more output devices 20 by the at least one local API 56. Additionally or alternatively, in embodiments in which the computing device 10 includes one or more input devices 18, the at least one local API 56 that is not included in the API whitelist 54 may be configured to convey at least one input 70 from the one or more input devices 18 to the web application 40.

Figure 2:
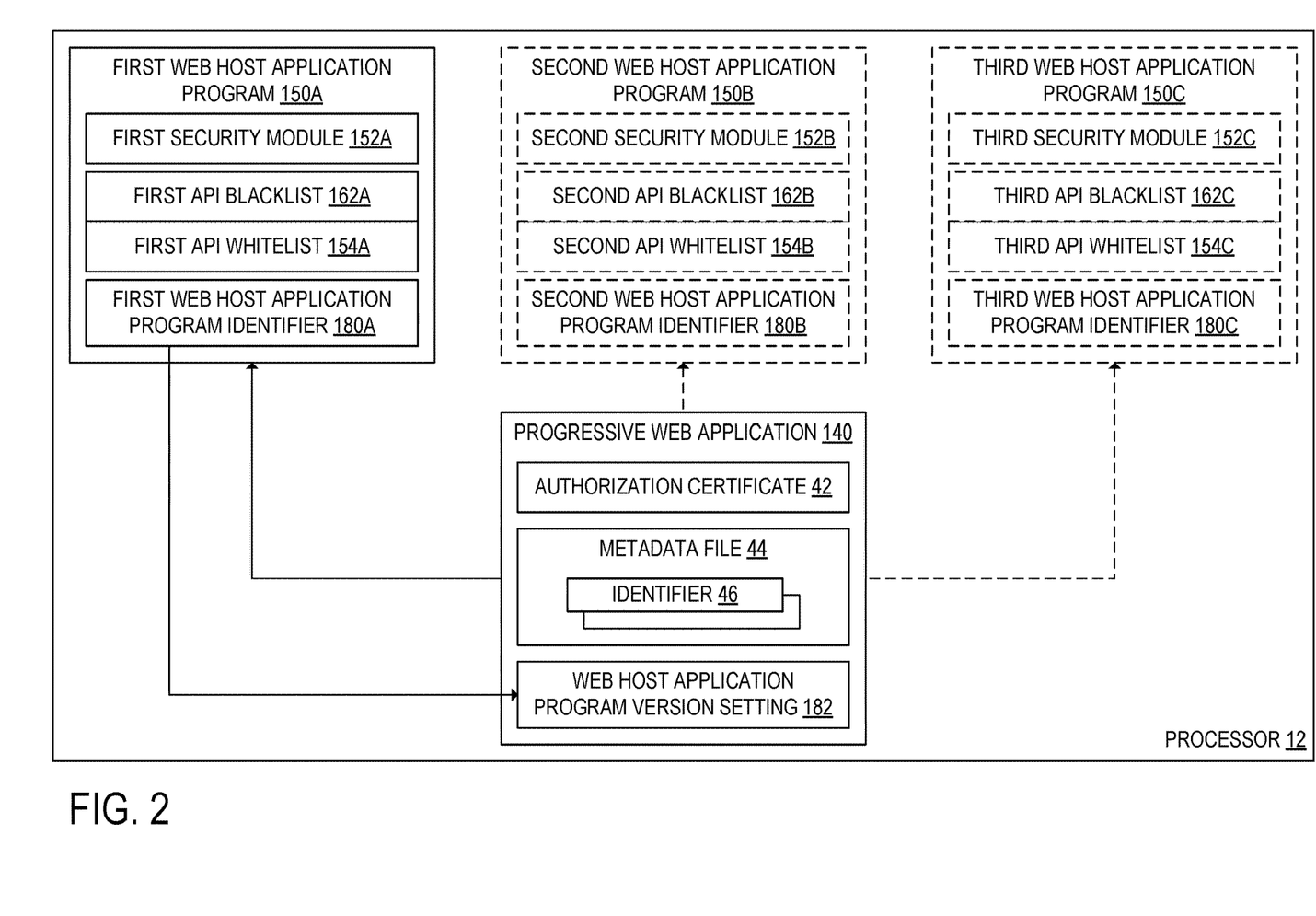
FIG. 2 shows an example progressive web application, according to the embodiment of FIG. 1.

In some embodiments, as shown in FIG. 2, the web application 40 may be a progressive web application 140 configured so that it may be executed at each web host application program of a plurality of web host application programs. The progressive web application 140 of FIG. 2 may be executed by the processor 12 of the computing device 10 shown in FIG. 1. In the example embodiment of FIG. 2, the plurality of web host application programs include a first web host application program 150A, a second web host application program 150B, and a third web host application program 150C. The first web host application program 150A, the second web host application program 150B, and the third web host application program 150C may, for example, be three versions of a web host application program configured to be executed on computing devices with different hardware and/or different operating systems. As shown in FIG. 2, the security modules, API whitelists, and/or API blacklists of the web host application programs may differ. The first web host application program 150A may include a first security module 152A, a first API whitelist 154A, and a first API blacklist 162A; the second web host application program 150B may include a second security module 152B, a second API whitelist 154B, and a second API blacklist 162B; and the third web host application program 150C may include a third security module 152C, a third API whitelist 154C, and a third API blacklist 162C.

The progressive web application 140 may include a web host application program version setting 182 that indicates the web host application program at which the progressive web application 140 is executed. In order to allow the progressive web application 140 to determine which web host application program is executed by the processor 12, the first web host application program 150A, the second web host application program 150B, and the third web host application program 150C may include a first web host application program identifier 180A, a second web host application program identifier 180B, and a third web host application program identifier 180C respectively. In the example of FIG. 2, the progressive web application 140 receives the first web host application program identifier 180A from the first web host application program 150A. In response to the progressive web application 140 receiving the first web host application program identifier 180A, the processor 12 may be configured to modify the web host application program version setting 182 of the progressive web application based on the first web host application program identifier 180A. If the progressive web application 140 receives the second web host application program identifier 180B or the third web host application program identifier 180C instead, the processor 12 may modify the web host application program version setting 182 so that the progressive web application 140 may instead be executed at the second web host application program 150B or the third web host application program 150C respectively.

Figure 3:
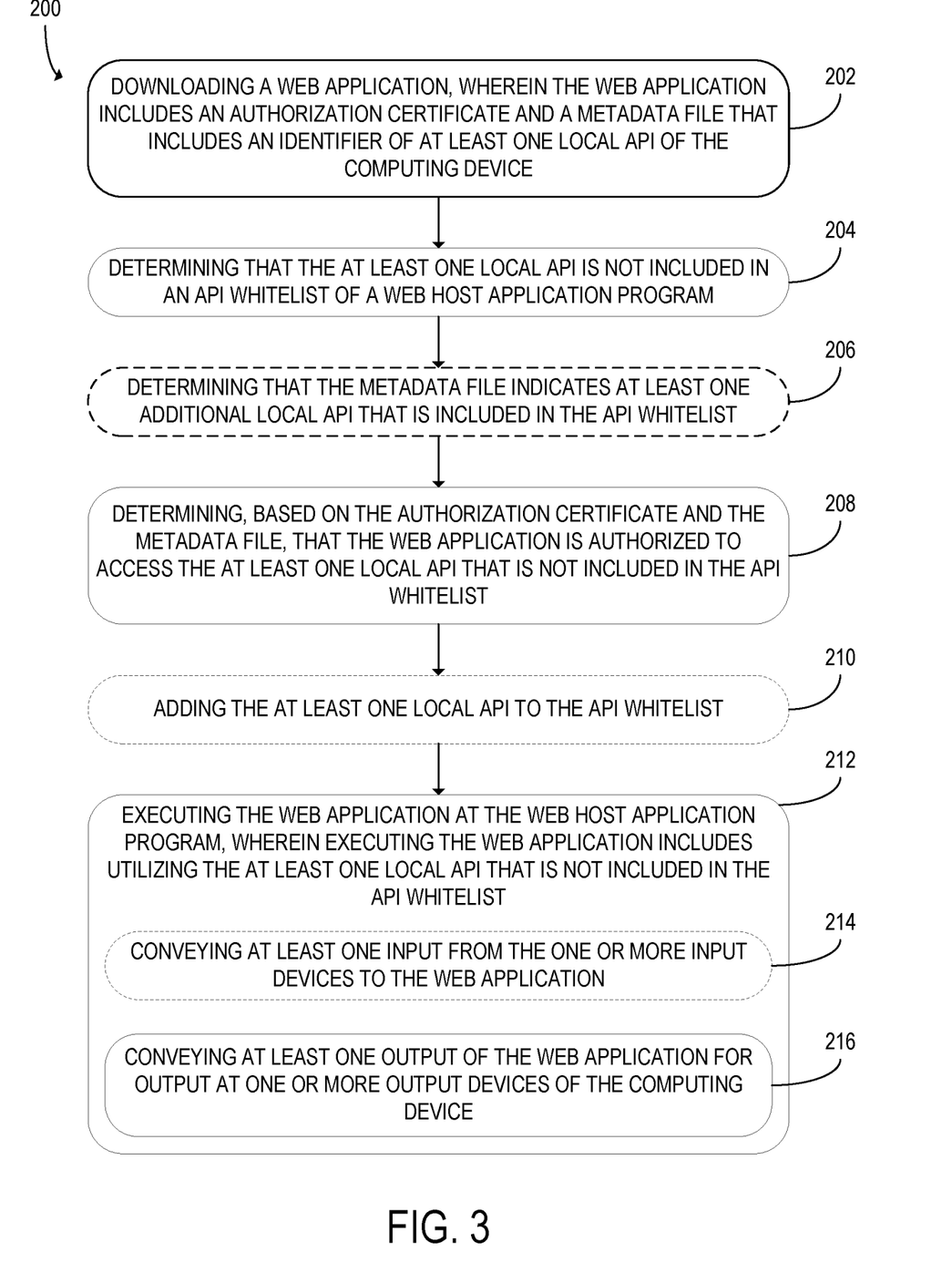
FIG. 3 shows a method for use with a computing device, according to the embodiment of FIG. 1.

FIG. 3 shows a flowchart of a method 200 for use with a computing device, which may be the computing device 10 of FIG. 1. The method 200 may include, at step 202, downloading a web application. The web application may include an authorization certificate. In addition, the web application may further include a metadata file that includes an identifier of at least one local API of the computing device. The web application may optionally be downloaded from an application store server. In some embodiments, the web application may be downloaded based at least in part on the authorization certificate and/or the metadata file. In such embodiments, the authorization certificate and/or the metadata file may be downloaded by the computing device prior to other portions of the web application. The web application may be downloaded via the web host application program in some embodiments.

At step 204, the method 200 may further include determining that the at least one local API is not included in an API whitelist of a web host application program. The web host application program may a web browser including at least one web browser GUI element that enables web navigation. In some embodiments, at step 206, the method 200 may further include determining that the metadata file indicates at least one additional local API that is included in the API whitelist.

At step 208, the method 200 may further include determining, based on the authorization certificate and the metadata file, that the web application is authorized to access the at least one local API that is not included in the API whitelist. In some embodiments, the method 200 may further include, at step 210, adding the at least one local API to the API whitelist. In some embodiments, the method 200 may further include determining, based on the authorization certificate and the metadata file, that the web application is not authorized to access at least one protected local API that is not included in the API whitelist. For example, the protected local API may be included in an API blacklist of the web host application program.

At step 212, the method 200 may further include executing the web application at the web host application program. Executing the web application may include utilizing the at least one local API that is not included in the API whitelist. In embodiments in which the method 200 includes determining that at least one additional local API is included in the API whitelist, executing the web application may further include utilizing the at least one additional local API. In some embodiments, the computing device with which the method 200 is performed may include one or more input devices. In such embodiments, executing the web application may include, at step 214, conveying at least one input from the one or more input devices of the computing device to the web application. The at least one input may be conveyed to the web application by the at least one local API that is not included in the API whitelist. Additionally or alternatively, the computing device may include one or more output devices, and the method 200 may include, at step 216, conveying at least one output of the web application for output at the one or more output devices of the computing device. The at least one output may be conveyed for output at the one or more output devices by the at least one local API that is not included in the API whitelist. In some embodiments, the input and/or the output may be conveyed to and/or from the web application by the at least one additional local API that is included in the API whitelist.

In some embodiments, the web application may be a progressive web application configured to be executed at each web host application program of a plurality of web host application programs. In such embodiments, the method may include modifying a web host application program version setting of the web application based on a web host application program identifier of the web host application program. Thus, the web application may be made compatible with the web host application program.

Figure 4:
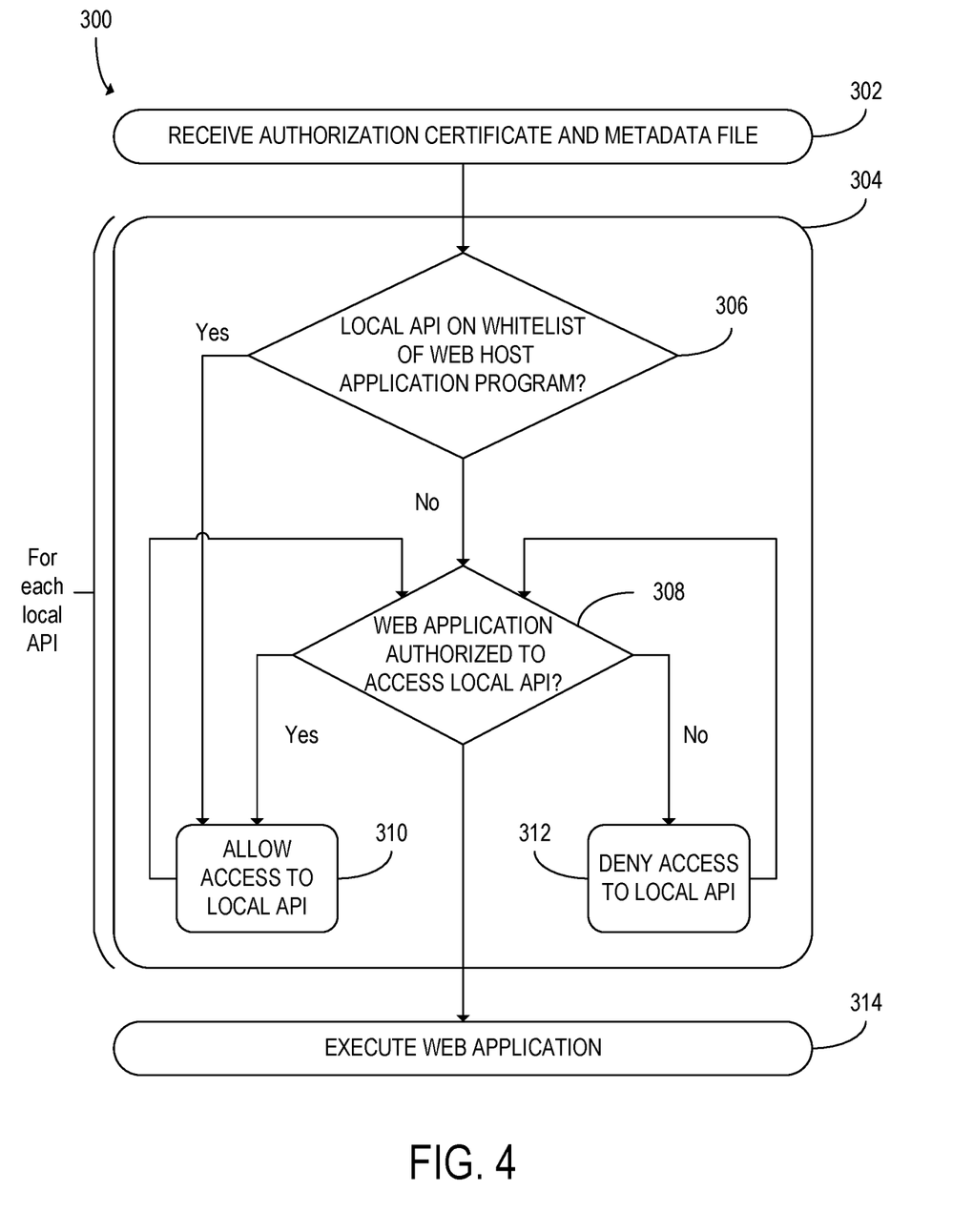
FIG. 4 shows a method performed by the processor at the web host application program, according to the embodiment of FIG. 1.

FIG. 4 shows the method 300 performed at the web host application program 50 in further detail. At step 302, the web host application program 50 may receive the authorization certificate 42 and the metadata file 44 of the web application 40. In some embodiments, the authorization certificate 42 and/or the metadata file 44 may be received after the web application 40 has been downloaded. In other embodiments, the web host application program 50 may receive the authorization certificate 42 and/or the metadata file 44 prior to downloading at least one other portion of the web application 40. For example, by downloading the authorization certificate 42 and/or the metadata file 44 prior to the at least one other portion, the processor 12 may determine whether the at least one other portion of the web application 40 would be safe to run. Additionally or alternatively, the processor 12 may determine whether the at least one other portion is compatible with the hardware and/or software of the computing device 10. For example, the processor 12 may determine whether the metadata file 44 indicates that any local API utilized by the web application 40 takes input from, or sends output to, an input device 18 or output device 20 not included in the computing device 10.

Block 304 of the method 300 may be repeated for each local API indicated in the metadata file 44 of the web application 40. Block 304 may include, at step 306, determining whether the local API is on the API whitelist of the web host application program 306. If the processor 12 determines that the local API is on the API whitelist 54, the processor 12 may allow the web application 40 access to that local API at step 310.

If the processor 12 determines that the local API is not on the API whitelist 54, the method 300 may proceed to step 308. At step 308, the processor 12 may determine whether the web application 40 is authorized to access the local API. This determination may be made based on the authorization certificate 42. If the processor 12 determines that the web application 40 is authorized to access the local API, the processor 12 may allow access to the local API at step 310. Otherwise, the processor 12 may deny the web application 40 access to the local API at step 312.

Block 304 may be repeated for each API indicated in the metadata file 44 of the web application 40. The method 300 may then proceed to step 314, at which the processor 12 may execute the web application 40 at the web host application program 50.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
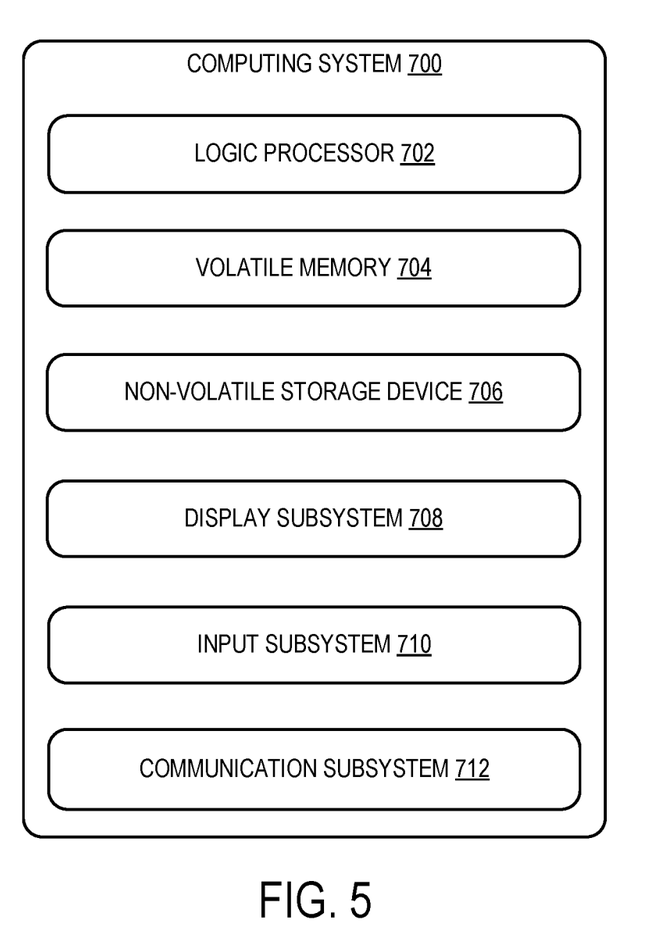
FIG. 5 shows a computing system according to an embodiment of the present disclosure.

FIG. 5 schematically shows a non-limiting embodiment of a computing system 700 that can enact one or more of the methods and processes described above. Computing system 700 is shown in simplified form. Computing system 700 may, for example, embody the computing device 10 of FIG. 1. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 700 includes a logic processor 702, volatile memory 704, and a non-volatile storage device 706. Computing system 700 may optionally include a display subsystem 708, input subsystem 710, communication subsystem 712, and/or other components not shown in FIG. 5.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 702 may include one or more physical processors (hardware) configured to execute software instructions. Additionally or alternatively, the logic processor 702 may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor 702 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 700 implemented to perform a particular function. In some cases, a program may be instantiated via logic processor 702 executing instructions held by non-volatile storage device 706, using portions of volatile memory 704. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 708 may be used to present a visual representation of data held by non-volatile storage device 706. As the herein described methods and processes change the data held by the non-volatile storage device 706, and thus transform the state of the non-volatile storage device 706, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem 710 may comprise or interface with selected natural user input (NUI) componentry. Such componentry may be integrated or peripheral, and the transduction and/or processing of input actions may be handled on-or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 712 may be configured to communicatively couple computing system 700 with one or more other computing devices. Communication subsystem 712 may include wired and/or wireless communication devices compatible with one or more different communication protocols. As non-limiting examples, the communication subsystem 712 may be configured for communication via a wireless telephone network, or a wired or wireless local- or wide-area network. In some embodiments, the communication subsystem 712 may allow computing system 700 to send and/or receive messages to and/or from other devices via a network such as the Internet.

According to one aspect of the present disclosure, a computing device is provided, including one or more output devices. The computing device may further include a processor configured to download a web application, wherein the web application includes an authorization certificate. The web application may further include a metadata file that includes an identifier of at least one local API of the computing device that is not included in an API whitelist of a web host application program executed by the processor. The processor may be further configured to determine, based on the authorization certificate and the metadata file, that the web application is authorized to access the at least one local API that is not included in the API whitelist. The processor may be further configured to execute the web application at the web host application program. Executing the web application may include utilizing the at least one local API that is not included in the API whitelist. The processor may be further configured to convey at least one output of the web application for output at the one or more output devices.

According to this aspect, the at least one output may be conveyed for output at the one or more output devices by the at least one local API that is not included in the API whitelist.

According to this aspect, the computing device may further include one or more input devices. The at least one local API that is not included in the API whitelist may be configured to convey at least one input from the one or more input devices to the web application.

According to this aspect, the web application may be downloaded from an application store server.

According to this aspect, the metadata file may indicate at least one additional local API that is included in the API whitelist.

According to this aspect, the processor may be further configured to add the at least one local API to the API whitelist.

According to this aspect, the web host application program may be a web browser.

According to this aspect, the at least one local API may be selected from a group consisting of a notification API, a contacts API, a calendar API, a messaging API, a virtual assistant API, a graphics API, a camera API, a microphone API, a speaker API, and a motion sensor API.

According to this aspect, the web application may be a progressive web application configured to be executed at each web host application program of a plurality of web host application programs.

According to this aspect, the web application may be downloaded via the web host application program.

According to another aspect of the present disclosure, a method for use with a computing device is provided. The method may include downloading a web application. The web application may include an authorization certificate. The web application may further include a metadata file that includes an identifier of at least one local API of the computing device. The method may further include determining that the at least one local API is not included in an API whitelist of a web host application program. The method may further include determining, based on the authorization certificate and the metadata file, that the web application is authorized to access the at least one local API that is not included in the API whitelist. The method may further include executing the web application at the web host application program. Executing the web application may include utilizing the at least one local API that is not included in the API whitelist. The method may further include conveying at least one output of the web application for output at one or more output devices of the computing device.

According to this aspect, the at least one output may be conveyed for output at the one or more output devices by the at least one local API that is not included in the API whitelist.

According to this aspect, the at least one local API that is not included in the API whitelist may be configured to convey at least one input from one or more input devices of the computing device to the web application.

According to this aspect, the web application may be downloaded from an application store server.

According to this aspect, the method may further include determining that the metadata file indicates at least one additional local API that is included in the API whitelist.

According to this aspect, the method may further include adding the at least one local API to the API whitelist.

According to this aspect, the web host application program may be a web browser.

According to this aspect, the web application may be a progressive web application configured to be executed at each web host application program of a plurality of web host application programs.

According to this aspect, the web application may be downloaded via the web host application program.

According to another aspect of the present disclosure, a computing device is provided, including one or more input devices, one or more output devices, and a processor. The processor may be configured to download a web application via a web host application program executed by the processor. The web application may include an authorization certificate. The web application may further include a metadata file that includes an identifier of a plurality of local APIs of the computing device. The processor may be further configured to determine that a first local API and a second local API of the plurality of APIs are not included in an API whitelist of the web host application program. The processor may be further configured to determine, based on the authorization certificate and the metadata file, that the web application is authorized to access the first local API and the second local API. The processor may be further configured to execute the web application at the web host application program. Executing the web application may include conveying at least one input from the one or more input devices to the web application via the first local API. Executing the web application may further include conveying at least one output of the web application for output at the one or more output devices via the second local API.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
   one or more output devices; and
   a processor configured to:
   execute a web host application program having an application program interface (API) whitelist indicating a plurality of APIs accessible to the web host application program, wherein the whitelist is a subset of a publicly available API suite;
   download a web application, wherein the web application includes:
     an authorization certificate indicating an identifier of a compatible local API of the computing device; and
     a metadata file that includes an identifier of at least one local API utilized by the web application that is included in the publicly available API suite and not indicated by the API whitelist;
   determine, based on the identifier of the compatible local API indicated by the authorization certificate and the identifier of the at least one local API included in the metadata file, that the web application is compatible with the computing device and authorized to access the at least one local API indicated by the metadata file that is not included in the API whitelist;
   execute the web application at the web host application program, wherein executing the web application includes utilizing the at least one local API that is not included in the API whitelist; and
   convey at least one output of the web application executed by the processor for output at the one or more output devices.

2. The computing device of claim 1, wherein the at least one output is conveyed for output at the one or more output devices by the at least one local API that is not included in the API whitelist.

3. The computing device of claim 1, further comprising one or more input devices, wherein the at least one local API that is not included in the API whitelist is configured to convey at least one input from the one or more input devices to the web application.

4. The computing device of claim 1, wherein the web application is downloaded from an application store server.

5. The computing device of claim 1, wherein the metadata file indicates at least one additional local API that is included in the API whitelist.

6. The computing device of claim 1, wherein the processor is further configured to add the at least one local API to the API whitelist.

7. The computing device of claim 1, wherein the web host application program is a web browser.

8. The computing device of claim 1, wherein the at least one local API is selected from a group consisting of a notification API, a contacts API, a calendar API, a messaging API, a virtual assistant API, a graphics API, a camera API, a microphone API, a speaker API, and a motion sensor API.

9. The computing device of claim 1, wherein the web application is a progressive web application configured to be executed at each web host application program of a plurality of web host application programs.

10. The computing device of claim 1, wherein the web application is downloaded via the web host application program.

11. The computing device of claim 1, wherein the authorization certificate further indicates a trusted source of the web application.

12. A method for use with a computing device, the method comprising:
   executing a web host application program having an application program interface (API) whitelist indicating a plurality of APIs accessible to the web host application program, wherein the whitelist is a subset of a publicly available API suite;
   downloading a web application, wherein the web application includes:
     an authorization certificate indicating an identifier of a compatible local API of the computing device; and
     a metadata file that includes an identifier of at least one local API utilized by the web application;
   determining that the at least one local API is included in the publicly available API suite and not indicated by the API whitelist;
   determining, based on the identifier of the compatible local API indicated by the authorization certificate and the identifier of the at least one local API included in the metadata file, that the web application is compatible with the computing device and authorized to access the at least one local API indicated by the metadata file that is not included in the API whitelist;
   executing the web application at the web host application program, wherein executing the web application includes utilizing the at least one local API that is not included in the API whitelist; and
   conveying at least one output of the web application executed by a processor of the computing device for output at one or more output devices of the computing device.

13. The method of claim 12, wherein the at least one output is conveyed for output at the one or more output devices by the at least one local API that is not included in the API whitelist.

14. The method of claim 12, wherein the at least one local API that is not included in the API whitelist is configured to convey at least one input from one or more input devices of the computing device to the web application.

15. The method of claim 12, wherein the web application is downloaded from an application store server or via the web host application program.

16. The method of claim 12, wherein the method further includes determining that the metadata file indicates at least one additional local API that is included in the API whitelist.

17. The method of claim 12, further comprising adding the at least one local API to the API whitelist.

18. The method of claim 12, wherein the web host application program is a web browser.

19. The method of claim 12, wherein the web application is a progressive web application configured to be executed at each web host application program of a plurality of web host application programs.

20. A computing device comprising:
   one or more input devices;
   one or more output devices; and
   a processor configured to:
   execute a web host application program having an application program interface (API) whitelist indicating a plurality of APIs accessible to the web host application program, wherein the whitelist is a subset of a publicly available API suite;

download a web application via the web host application program executed by the processor, wherein the web application includes:
an authorization certificate indicating:
a trusted source of the web application; and
an identifier of a compatible local API of the computing device; and
a metadata file that includes an identifier of a plurality of local APIs utilized by the web application;
determine that a first local API and a second local API of the plurality of local APIs are included in the publicly available API suite and not indicated by the API whitelist of the web host application program;
determine, based on the identifier of the compatible local API indicated by the authorization certificate and the identifier of the plurality of local APIs included in the metadata file, that the web application is compatible with the computing device and authorized to access the first local API and the second local API; and
execute the web application at the web host application program, wherein executing the web application includes:
conveying at least one input from the one or more input devices to the web application executed by the processor via the first local API; and
conveying at least one output of the web application executed by the processor for output at the one or more output devices via the second local API.

\* \* \* \* \*